United States Patent
Schultheis

[19]

[11] Patent Number: 5,981,914
[45] Date of Patent: Nov. 9, 1999

[54] MODULAR GRILLING AND COOKING APPARATUS

[75] Inventor: Bernd Schultheis, Schwabenheim, Germany

[73] Assignee: Schott Glaswerke, Mainz, Germany

[21] Appl. No.: 09/016,670

[22] Filed: Jan. 30, 1998

[30] Foreign Application Priority Data

Jan. 31, 1997 [DE] Germany .......................... 197 03 532

[51] Int. Cl.⁶ .............................. H05B 3/68; A47J 27/00
[52] U.S. Cl. .................................. 219/452.11; 219/460.1; 99/444
[58] Field of Search .............................. 219/450.1, 451.1, 219/452.11, 460.1, 461.1, 462.1, 465.1, 466.1, 467.1; 126/39 H, 39 J; 99/444, 445

[56] References Cited

U.S. PATENT DOCUMENTS

| | | | |
|---|---|---|---|
| 3,098,924 | 7/1963 | Salton et al. ........................ | 219/452.11 |
| 3,866,018 | 2/1975 | Hurko ................................. | 219/452.11 |
| 3,870,862 | 3/1975 | Doner ................................. | 219/452.11 |
| 4,150,280 | 4/1979 | Hurko ................................. | 219/465.1 |
| 4,453,533 | 6/1984 | Scheider et al. .................... | 219/452.11 |
| 4,788,414 | 11/1988 | Schreder ............................ | 219/452.11 |
| 4,900,899 | 2/1990 | Schreder et al. ..................... | 219/460.1 |
| 5,160,830 | 11/1992 | Kicherer et al. .................... | 219/452.11 |

*Primary Examiner*—Teresa J. Walberg
*Assistant Examiner*—Sam Paik

[57] ABSTRACT

An encapsulated, standardized, ready-to-use, transportable, modular grilling and/or cooking unit with a grilling or cooking surface of glass, glass ceramic or ceramic is provided, with at least one electrically heated grilling and/or cooking zone. A housing designed as a tub-shaped trough is joined in a fixed and liquid-tight manner to the grilling and/or cooking plate and holds the necessary operating components, such as heating elements, regulating and control devices, heat insulation, vibration absorbers to protect against shocks during transport, indicator and safety devices and a separate electrical supply line which is removable from its point of attachment in the housing in a liquid-tight manner. The unit is suitable for both permanent installation or temporary placement in an appropriate stationary or mobile receiving frame, especially a frame system, such as a cutout in a work surface of a kitchen or in a grill cart.

14 Claims, 4 Drawing Sheets

MODULAR GRILLING AND COOKING APPARATUS

FIELD OF THE INVENTION

The invention relates to a standardized, ready-to-use, transportable, modular grilling and/or cooking unit with a ceramic glass, glass, or ceramic cooking surface, with at least one electrically heated grilling and/or cooking zone, with a tub-like trough joined in a liquid-tight manner to said grilling or cooking surface, which trough serves as a housing to hold components necessary for the operation of the unit.

DESCRIPTION OF THE PRIOR ART

Tabletop grilling devices are known for example from German DE 42 22 323 A1 which discloses a grilling device with a grilling plate, a grilling surface, of brittle material, for example ceramic glass, and with a housing into the walls of which the plate is incorporated, where an edge enclosure incorporating a grease drip channel is provided, enclosing the sides of the grilling plate.

The construction of the metal housing disclosed in the Letters of Disclosure is very costly and difficult to manufacture, and is difficult to clean since the sheet metal components are joined at right angles, thus preventing complete removal of residue. In addition, this type of device cannot be cleaned under running water. Furthermore, such a device is not suitable for alternating stationary and mobile use.

In addition, the utility model patent DE 296 07 740 U1 discloses an electric grilling device comprising a ceramic glass plate where the food to be grilled can be placed, and at least one tubular heating element arranged under the grilling plate, where said tubular heating element has a heating tube component which extends, in a snaking fashion in one plane, and where another, second heating tube likewise extends, in one plane, in a snaking fashion which follows that of the first tube element section.

These special tubular heat elements were specifically designed for grilling purposes.

Additional embodiments of grilling and cooking devices with ceramic glass surfaces, are manufactured by several enterprises and are known in the marketplace.

SUMMARY OF THE INVENTION

The object of the invention is to provide a grilling and/or cooking device that can be easily exchanged at any time and which is in addition extremely easy to clean, can be used in the most diverse circumstances for cooking, grilling, baking and warm-keeping both in stationary and mobile use, such as for example in the yard or on a terrace, and can also be developed into a manufacturer or customer-specific unit by means of additional design and functional elements.

The object of the invention is attained by a sealed, standardized, transportable, modular grilling and cooking unit that is ready for use, with a grilling or cooking surface made of ceramic glass, glass or ceramic, with at least one electrically heated grilling or cooking zone, where the grilling and/or cooking surface is attached, fixed and liquid-proof, to a tub-shaped trough which serves as a housing for the components necessary for operation of the unit, i. e., heater elements, regulating and control devices, heat insulation, vibration damper for transport, and indicator and safety devices, and where the separate electrical supply can be removed from its point of attachment at the unit in a liquid-proof manner, and which is suitable for both permanent or mobile installation in a receiving system, especially a frame system, such as a cutout in a work surface of a modular kitchen or mobile grill cart.

According to the invention, this modular device is encapsulated and can be integrated for example permanently into a frame of a kitchen work surface, or in a table, or it can be portably installed in a table top housing or a grill cart.

In an additional very advantageous embodiment this modular grilling and/or cooking unit can also be operated without an additional housing, whether a frame or a receptacle.

The housing of the trough which is joined with the grilling and/or cooking surface, is made of heat-resistant plastic. Suitable plastics are for example polyetherimide (PEI), polyphenyl sulfone (PPS), polyethyleneterephthalate (PETP), polybuteleneterephthalate (PBTP), blends of PETP and PBTP, or duroplastics based on unsaturated polyesters, or melamine resins.

Metal housings, preferably of stainless steel sheet metal, are also suitable.

It is essential for the invention that the housing of this trough is constructed in one piece and is joined with the grilling and/or cooking surface in a leak-proof manner. The housing does not have any sort of openings.

Only on the bottom side there is the leak-proof electrical plug-in connection, pressed in, or injection-molded. These plug-in connections are built into the housing trough such that electrical device plugs can be inserted in a positive fit.

The grilling and/or cooking plate is glued to the tub-shaped housing which, in a preferable embodiment, is of one-piece construction.

Due to their chemical and thermal stability silicon glues are especially suitable therefor.

Due to the liquid-proof encapsulation it is even possible to wash or hose down these modular grilling and/or cooking devices with water, which makes a thorough cleaning extremely easy and guarantees the greatest possible hygiene.

The modular concept also makes the replacement of a defective unit possible without any particular technical expertise, which greatly simplifies servicing.

Housings comprising two or more parts are also possible according to the invention, for example a housing with a removable base plate, where, however, additional sealing means must then prevent penetration of liquids, especially during cleaning.

These modular grilling and/or cooking devices are substantially rectangular and can be equipped with round heating elements (so-called 1K or 2K cooking devices) or with at least one rectangular grill/heat element.

Heating elements can be radiating heating elements, tubular heating elements and so-called flat heating elements, such as for example foil heating elements which have been described in sufficient detail in the literature, including patent documents.

Rectangular radiating heating elements with a heated surface of about 240×300 mm and an output of 2,330 to 3,500 watts are mainly used for grilling. The temperature of the grilling surface is limited to 520° C. to 560° C. by means of a safety temperature limiter. Power regulation is commonly provided by electromechanical power regulators which maintain the grilling surface temperature at 300 to 400° C.

Lower temperatures, for example for gentle cooking or warmkeeping of grilled food, can also be adjusted by this means. Full power can be used when needed, especially during the heating up, or when large amounts of food are to be cooked. In addition, grilling heat elements with lower power density (up to 4 W/cm$^2$) can also be used and in this case temperature limiters can be dispensed with, resulting in cost advantages without substantial loss of output performance.

Especially suitable for cooking applications are round radiating heat elements with diameters of 145, 180 or 210 mm. These heat elements have generally a power density between 6 and 8 W/cm$^2$.

Particularly suitable for grilling or cooking surfaces are glass ceramic plates which distinguish themselves by their high resistance to thermal shocks. They are for examples CERAN®, a transparent glass ceramic, black in appearance, made by Schott Glaswerke, Mainz, or NEOCERAM®, a white opaque glass ceramic made by NEG, Japan.

Suitable for grilling is also VIOLAN® glass ceramic made by SCHOTT, Mainz, a glass ceramic with a grooved surface structure.

Possible are also ceramics with high heat conductivity, for example aluminum nitride, silicon nitride, silicon carbide or aluminum oxide.

Glass, for example borosilicate glass, can in general only be considered for the warmkeeping surfaces which have correspondingly lower surface temperatures, due to significantly lower resistance of glass to thermal shocks.

In a preferred embodiment according to the invention, the separate electrical supply which can be unplugged from the unit also comprises the regulating and control units. The advantage of this is that no further leadthrough seals are needed in the grilling and/or cooking unit for knobs, buttons or control indicators.

In an additional preferred embodiment the unit exhibits a circumferential groove and/or a depression with a removable insert, especially as a grease collector. The groove or depression can be provided either in the cooking surface or in the housing which is joined to the surface in a liquid-proof manner.

Further, the invention provides for an allround splash guard, which can also be designed closed on top, as a cover.

Several of these modular grilling and/or cooking units according to the invention can be combined into a larger functional unit and, depending on need and requirement, can thus form units of any size.

BRIEF DESCRIPTION OF THE DRAWINGS

The invention will be described in more detail with reference to the following examples.

There are shown in

DETAILED DESCRIPTION

Figure 1:
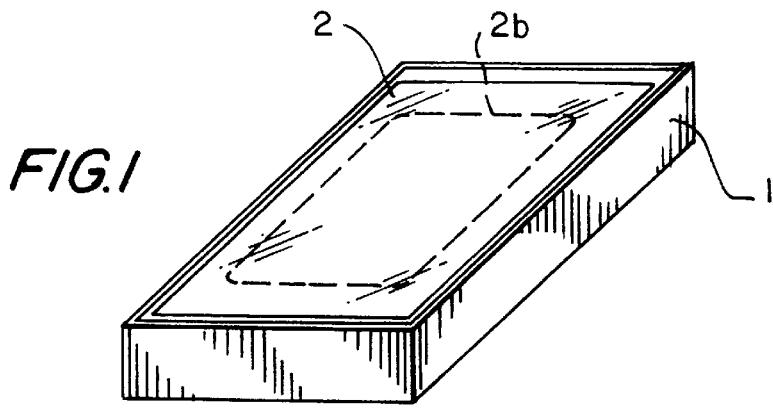
FIG. 1, showing schematically the possible ways of inserting the grilling and/or cooking unit 1.
Figure 1B:
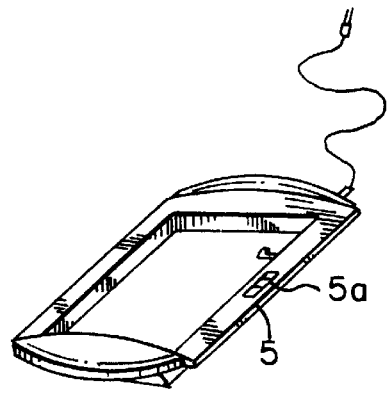
Figure 1A:
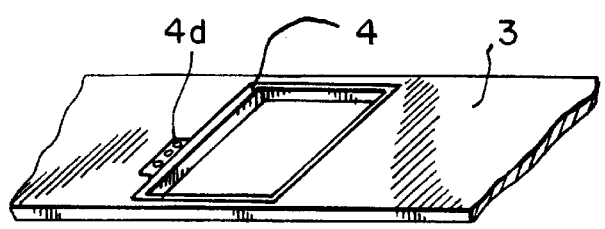
Figure 1E:
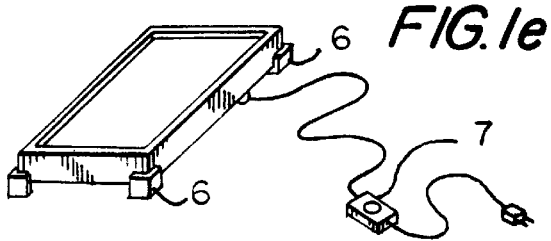
Figure 1C:
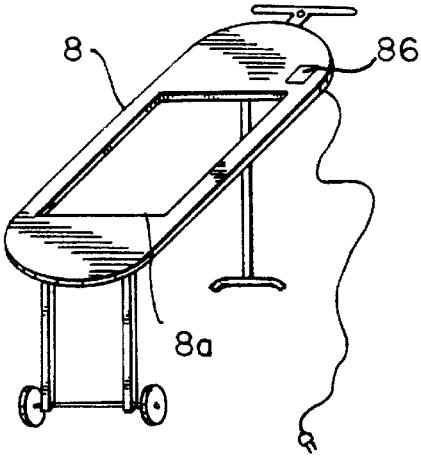
Figure 1D:
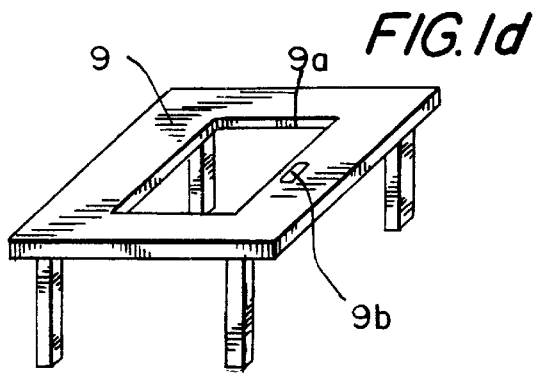

FIG. 1 shows the various possible installations of the grilling and/or cooking unit 1 with the preferred smooth glass ceramic surface 2. In addition, the rectangular heated zone 2b can be seen in this example.

The modular unit 1 can be described as follows:
a) installed in kitchen work surface 3, where a special installation frame 4 with integrated operating elements 4c, such as switches and indicators, holds the module 1, or,
b) installed in a tabletop housing 5, also provided with operating elements 5a, where the tabletop housing 5 can be of different materials, in general less temperature resistant, such as plastics developed for small kitchen appliances, or material combinations, such as extruded aluminum sections and plastics, or,
c) installed in the cutout 8a of a grill cart 8, also provided with operating elements 8b, or,
d) installed in the cutout 9a of a table 9, also provided with operating elements 9b, or,
e) freestanding, with inserted unit legs 6 or with integrated unit legs (not shown here), where in this case the operating elements 7 are integrated in the electrical power supply of the unit.

Figure 2:
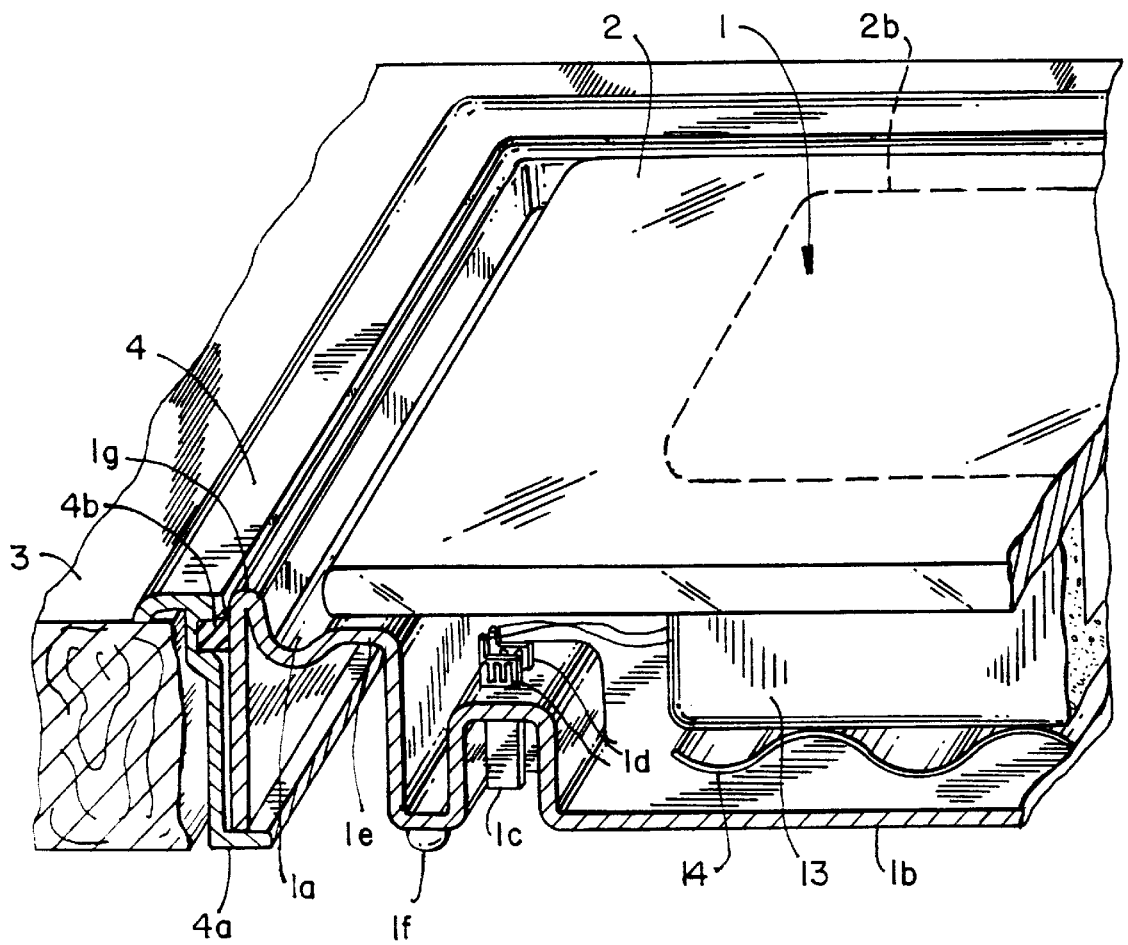
FIG. 2, showing a sectional view of a grilling and/or cooking unit 1.

FIG. 2 shows in cross section a segment of the kitchen work surface 3, installation frame 4 and modular grilling and/or cooking unit 1. The module housing 1b which is substantially tub-shaped, can be seen there, preferably embodied as a one-piece unit. The glass ceramic grilling and/or cooking surface 2 is glued along its circumference to the contact surface 1e of the housing 1b by long-life, elastic, temperature resistant adhesive, preferably silicon adhesive. The preferably circumferential grease channel 1a is here shaped directly in the housing and terminates in a grease collector (not shown). In this embodiment, the excess fat can be very easily scraped from the grilling surface 2 with a scraper or left to drip by itself into the grease channel 1a, which is very useful when the grill unit is not installed or set down perfectly level. A bubble level can be provided in the housing 1b to simplify installation and levelling, especially outdoors.

The geometry of the grease channel 1a is such that it can be cleaned easily with a rag and that it is relatively shallow (3–10 mm deep) and about 15–20 mm wide, and that it has a substantially round geometry so that excess grease can be easily removed. The outer edge of the housing 1g should extend slightly beyond the upper edge of the grill/cook surface 2 so that the edge of the grill/cook surface 2 is protected from falling objects.

In the trough-shaped housing 1b an indentation 1c is provided, into which electrical plugs can be tightly inserted. Electrical pin contacts 1d are pressed into the housing 1b, molded in or set in with a sealer, in a fluid-tight manner.

Inside the housing are only the heating element 13 and the ridge and snap clips (not shown) serving to stiffen the module 1 and/or position and fix the heating element 13. In a preferred embodiment they can be formed directly with the housing 1b during the manufacturing process.

To assure an elastic mounting of the heating element 13, necessary particularly in view of mechanical impact loads during actual use, thin wavy sheet metal pieces under the heating element 13 are proposed in one embodiment, using for example aluminum, which metal pieces are able to give and which protect the bottom of the housing directly under the heating element 13 from excessive heat radiation.

According to the invention, permanently elastic fiberglass mats or other ceramic damping materials can also be used as heat insulation and impact absorbers FIG. 2 further shows a part of the receiving frame 4. In addition the abovementioned operating elements and the plug connection for the pin connectors 1d (not shown), the frame comprises an angled area 4a on which the modular grilling and/or cooking unit 1 rests when installed. Circumferential seal element 4b, preferably profiled seals, prevent moisture penetration between frame 4 and module 1.

An easy removal of the module is preferably accomplished by means of grips formed into the housing 1b or by means of recessed built-in handles.

Feet 11 are already integrated into the underside of the modular grilling and/or cooking unit 1 for separate, free-standing operation, allowing a secure, non-slipping table top placement. A preferred embodiment provides simple rubber feet. The only thing that needs to be considered during design is the shape of the separate electrical supply device plug comprising operating elements 7 as shown in FIG. 1. Foldout feet are also possible and they would be located inside a special depression (indentation in the housing 1b) when collapsed.

Figure 3A:
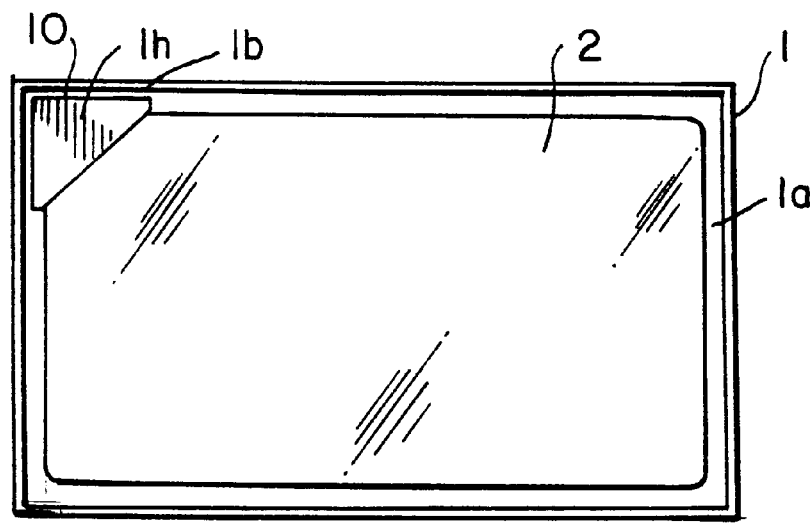
FIG. 3a, showing a top view of an embodiment example with a smooth glass ceramic grilling surface 2 and a circumferential grease runoff channel 1a, and a grease catch container at one corner 1h.
Figure 3B:
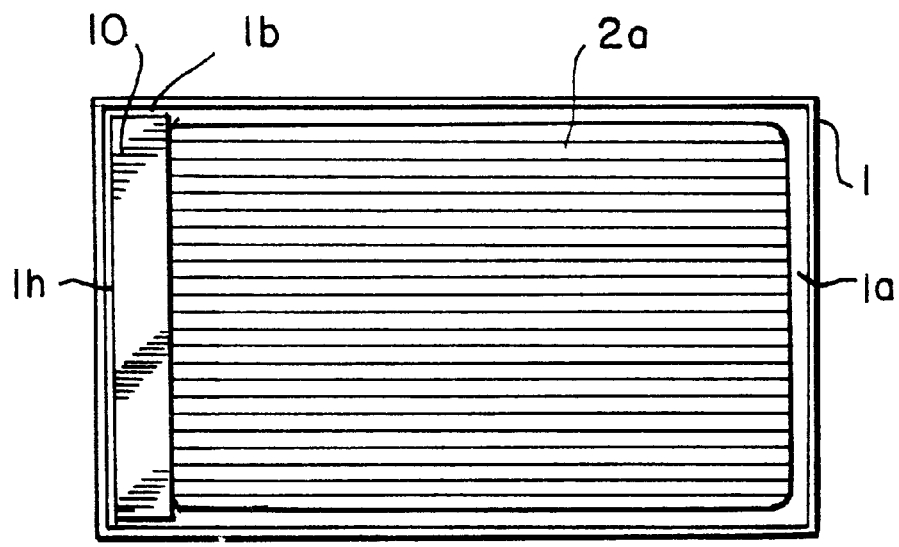
FIG. 3b, showing a top view of an additional example with a circumferential grease runoff channel 1a, a VIOLAN® grilling surface 2a and a grease catch container 1h at the face side of module 1; and in FIG. 4, showing a schematic side view of a grilling module 1 with splash cover 11 and a hinge 12 integrated in the module.
Figure 4:
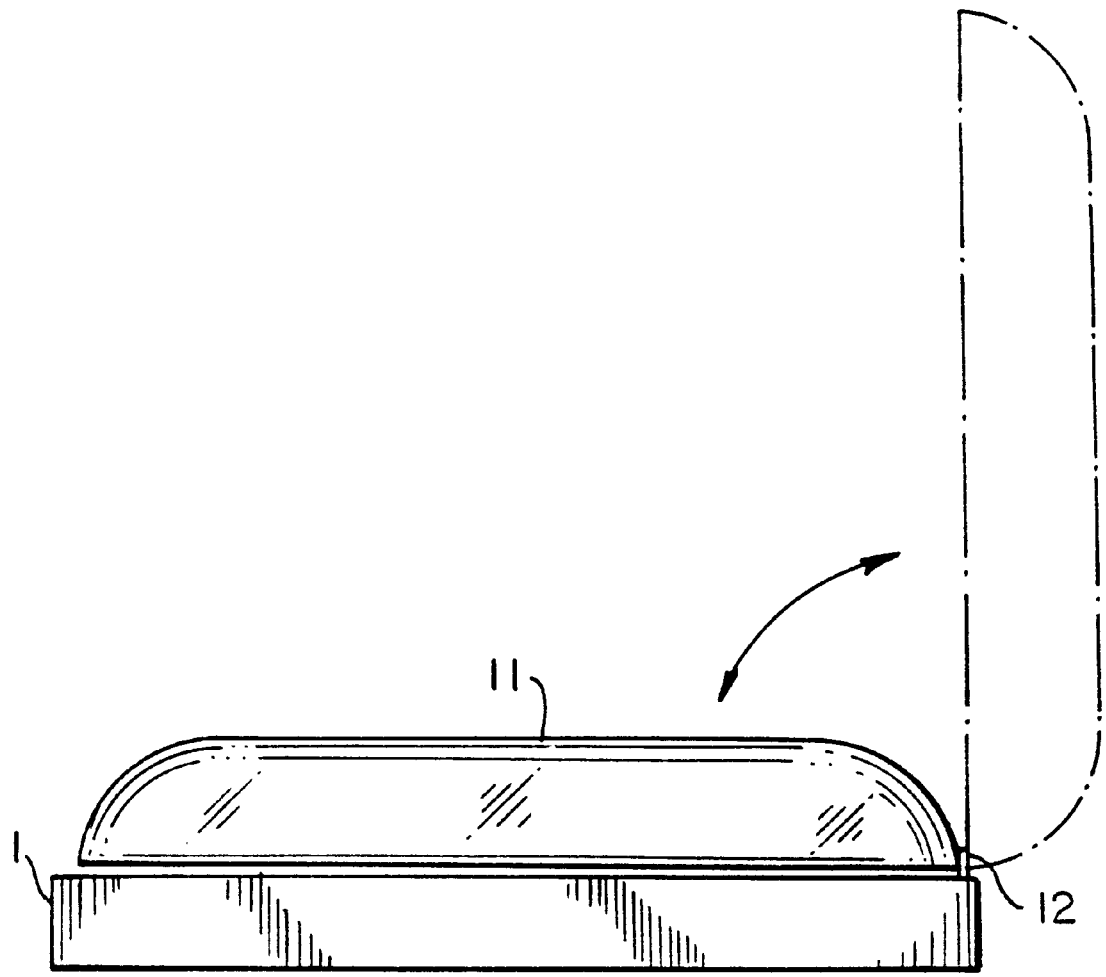

FIGS. 3a and 3b schematically show special design possibilities of the grilling and/or cooking module 1. A characteristic feature therein is the circumferential grease channel 1a and an additional depression in the housing 1h which serves as a grease catch container. An additional removable insert 10 of plastic, glass or corrosion resistant sheet metal, can be placed there.

A hinge 12 integrated in the module housing 1 makes possible the installation of a splash cover 11 when required, of glass or heat resistant transparent plastic, for example acrylate plastics (PMMA), polycarbonates or PET. Especially when installed in a kitchen, this prevents grease from splattering on surrounding surfaces. In a preferred embodiment the hinge is provided with a spring mechanism into which the splash cover 11 can be pressed. The cover 11 can be removed for cleaning and can be cleaned for example in a dish washer. Furthermore, the cover can be provided additionally with odor filters.

The concept of this device offers advantages vis-à-vis prior art which include:

easily installed, standardized basic module (cost saving),
 various design possibilities for the most varied uses,
 highly flexible and mobile (e.g., for vacation),
 easily replaced for servicing,
 easily cleaned,
 additional integration of useful accessories in the housing.

What is claimed is:

1. A modular unit for grilling and/or cooking, said unit comprising:
    a cooking surface of ceramic glass, glass, or ceramic material including at least one electrically heated grilling and/or cooking zone;
    a tub-shaped trough joined in a fixed and liquid-tight manner to said cooking surface, said trough serving as a housing holding components for grilling or cooking operation of the unit; and
    a separate leak-proof, removable electrical supply line supplying power to said unit for heating;
    said unit being configured for permanent or temporary placement in a corresponding frame for said grilling or cooking unit in a stationary installation such as in a work-surface cutout in a modular kitchen or in a mobile application such as a grill cart;
    wherein the unit has a circumferential channel therein around the cooking surface and removable insert in said circumferential channel.

2. A modular unit according to claim 1, and said components being selected from the group consisting of heating elements, regulating and controlling devices, thermal insulation, vibration damper to protect during transport, indicator and safety devices.

3. A modular unit according to claim 1, wherein the trough housing which is joined to the grilling and/or cooking surface, is made of heat-resistant plastic material.

4. A modular unit according to claim 3, wherein the plastic material is a thermoplastic.

5. A modular unit according to claim 3, wherein the plastic material is selected from the group consisting of polyetherimides (PEI), polyphenyl sulfones (PPS), polyethyleneterephthalates (PETP), polybutyleneterephthalates (PBTP), PETP/PBTP blends, and duroplastics based on glass fiber reinforced melamine resins or unsaturated polyesters.

6. A modular unit according to claim 1, wherein the trough housing which is joined to the grilling and/or cooking surface, is made of metal.

7. A modular unit according to claim 1, wherein the trough housing which is joined to the grilling and/or cooking surface, is made of stainless steel.

8. A modular unit according to claim 1, wherein the trough housing is of one-piece construction.

9. A modular unit according to claim 8, wherein the joint between the trough housing and the grilling and/or cooking surface is accomplished by means of an adhesive.

10. A modular unit according to claim 8, wherein the separate electrical supply which is detachable from the unit includes means for controlling the unit.

11. A modular unit according to claim 1, wherein the unit is provided with a circumferential splash guard closed on its upper side.

12. A modular unit according to claim 1, wherein the trough supports therein a heat shield or shock absorber formed using a wavy metal sheet.

13. A modular unit according to claim 12, wherein the metal sheet is of aluminum.

14. A grilling and/or cooking functional area formed of a combination of a plurality of modular grilling and/or cooking units according to claim 1.

\* \* \* \* \*